United States Patent
Amma et al.

(10) Patent No.: US 9,287,717 B2
(45) Date of Patent: Mar. 15, 2016

(54) POWER RECEIVING DEVICE AND WIRELESS POWER TRANSMISSION SYSTEM

(75) Inventors: Kenichi Amma, Tokyo (JP); Tomohisa Kimura, Tokyo (JP); Nobuhiko Fukuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 950 days.

(21) Appl. No.: 13/387,500

(22) PCT Filed: Nov. 24, 2010

(86) PCT No.: PCT/JP2010/070871
§ 371 (c)(1),
(2), (4) Date: Jan. 27, 2012

(87) PCT Pub. No.: WO2011/065352
PCT Pub. Date: Jun. 3, 2011

(65) Prior Publication Data
US 2012/0133216 A1     May 31, 2012

(30) Foreign Application Priority Data
Nov. 26, 2009 (JP) ................................. 2009-269197

(51) Int. Cl.
H02J 5/00 (2006.01)
H02J 17/00 (2006.01)

(52) U.S. Cl.
CPC ........ *H02J 5/005* (2013.01); *H02J 17/00* (2013.01)

(58) Field of Classification Search
CPC ......... G06K 19/077; H02J 17/00; H01Q 1/24; H01Q 1/22; H01Q 5/00
USPC ........................................................ 307/104
See application file for complete search history.

(56) References Cited

U.S. PATENT DOCUMENTS

2009/0200985 A1* 8/2009 Zane ................... H01Q 1/2225
320/108

FOREIGN PATENT DOCUMENTS

| JP | 8-33243 | 2/1996 |
|---|---|---|
| JP | 11-46450 | 2/1999 |

(Continued)

OTHER PUBLICATIONS

Decision to Grant a Patent issued Oct. 22, 2013 in corresponding Japanese Application No. 2009-269197.

(Continued)

*Primary Examiner* — Thienvu Tran
*Assistant Examiner* — David M Stables
(74) *Attorney, Agent, or Firm* — Wenderoth, Lind & Ponack, L.L.P.

(57) ABSTRACT

A power receiving device includes: a plurality of antennas, a plurality of rectenna rectifying circuits each of which is provided to correspond to each of the antennas and each of which converts electromagnetic waves received by the corresponding antenna into DC power and outputs the DC power; a connection switching circuit which is provided between the plurality of rectenna rectifying circuits and a load and which performs switching between serial/parallel connection states of the output side of the plurality of rectenna rectifying circuits; a current sensor which measures current flowing through the load; and a control section which, on the basis of the current measured by the current sensor, selects a serial/parallel connection state of the rectenna rectifying circuits, the state enabling the RF-DC conversion efficiency to be maximized, and which controls the connection switching circuit so that the rectenna rectifying circuits is in the selected serial/parallel connection state.

1 Claim, 8 Drawing Sheets

(56) References Cited

FOREIGN PATENT DOCUMENTS

| | | |
|---|---|---|
| JP | 11-46451 | 2/1999 |
| JP | 2003-309938 | 10/2003 |
| JP | WO2005/104331 | 11/2005 |
| JP | 2008-199857 | 8/2008 |
| JP | 2009-38924 | 2/2009 |
| JP | 2009-65726 | 3/2009 |
| JP | 2009-513098 | 3/2009 |
| JP | 2009-278782 | 11/2009 |
| WO | 2007/048052 | 4/2007 |
| WO | WO 2007048052 A2 * | 4/2007 ........... H01Q 1/2225 |

OTHER PUBLICATIONS

International Search Report issued Feb. 15, 2011 in corresponding International Application No. PCT/JP2010/070871.

Office Action issued May 21, 2013 in corresponding Japanese Application No. 2009-269197 (with partial English translation).

* cited by examiner

| SWITCH<br>CURRENT RANGE | K1 | K2 |
|---|---|---|
| $I \leqq I_1$ | ON | ON |
| $I_1 < I \leqq I_2$ | OFF | ON |
| $I_2 < I$ | OFF | OFF |

POWER RECEIVING DEVICE AND WIRELESS POWER TRANSMISSION SYSTEM

TECHNICAL FIELD

The present invention relates to a power receiving device used, for example, in a space solar power generation system in which a very large solar battery panel is expanded in a cosmic space and in which the electric power generated by the solar battery panel is transmitted to the ground by microwaves.

BACKGROUND ART

In recent years, according to the increase in carbon-dioxide emissions due to the use of fossil fuel, environmental problems, such as global warming, and energy problems, such as fossil fuel depletion, have attracted public attention. For this reason, the demand for clean energy has been further increasing year by year. As one of the solutions to the problems, there is listed a space solar power generation system (SSPS: Space Solar Power System) project. In the SSPS project, as shown in FIG. 9, an artificial satellite, on which a very large solar battery panel is mounted, is launched at the equator, and the electric power generated from sunlight is converted into microwaves by a power transmission module provided in the solar battery panel. The microwaves 100 are transmitted from a microwave power transmission section 101 to a ground power receiving base station 102 installed on the ground. The transmitted microwaves are utilized on the ground by being again converted into electric power.

Thereby, clean energy can be stably supplied without being subjected to the disadvantages of the solar power generation, that is, without being affected by weather conditions and time zone. As technical problems to realize this project, problems relating to large power transmission, microwave beam control, reduction of operation cost, and the like, are listed. As one of various techniques for solving the problems, a technique for improving the RF-DC conversion efficiency in the ground power receiving base station 102 is listed (see, for example, Patent Literature 1).

In the above-described wireless power transmission system in which electric power is transmitted by being converted into electromagnetic waves, such as microwaves, and in which the electromagnetic waves are received and then electric power is extracted from the received electromagnetic waves, it is generally known that, in order to improve the RF-DC conversion efficiency in a power receiving device, a resistor, which has a resistance value maximizing the RF-DC conversion efficiency with respect to a design value of input power, is connected to a subsequent stage of a rectenna (RF-DC conversion element for converting electromagnetic waves into DC power).

CITATION LIST

Patent Literature

{PTL 1} Japanese Unexamined Patent Application, Publication No. 2009-38924

SUMMARY OF INVENTION

Technical Problem

However, in the wireless power transmission system, the state of electromagnetic waves to be received is varied by the transmission state of electromagnetic waves, and the like. Therefore, the power inputted to the rectenna is varied and is not necessarily fixed to the design value.

The resistance value which maximizes the RF-DC conversion efficiency is varied according to the input power. Therefore, there is a possibility that, when the resistance value is determined to correspond to the design value, the RF-DC conversion efficiency is significantly reduced depending on the reception state of electromagnetic waves.

In the wireless power transmission system, there is a case where the power outputted from the rectenna is supplied to a commercial power system. In this case, a load of the commercial power system becomes a load of the subsequent stage of the rectenna. However, the load of the commercial power system is determined on the user side, and hence the value of the load cannot be freely varied. For this reason, a load which maximizes the RF-DC conversion efficiency cannot be selected, and hence the RF-DC conversion efficiency cannot be improved.

The present invention has been made in view of the above-described circumstances. An object of the invention is to provide a power receiving device and a wireless power transmission system, which can improve the RF-DC conversion efficiency even when the input power is varied.

Solution to Problem

In order to solve the above described problem, the present invention employs following configuration.

An aspect of the present invention provides a power receiving device including: a plurality of antennas; a plurality of rectifying sections each of which is provided to correspond to one of or a plurality of the antennas and each of which converts electromagnetic waves received by the corresponding antenna into DC power and outputs the DC power; a connection switching section which is provided between the plurality of rectifying sections and a load and which performs switching between serial/parallel connection states of the output side of the plurality of rectifying sections; a current measuring section which measures current flowing through the load; and a control section which, on the basis of measured current measured by the current measuring section, selects a serial/parallel connection state of the rectifying sections, the state enabling RF-DC conversion efficiency to be maximized, and which controls the connection switching section so that the rectifying sections are in the selected serial/parallel connection state.

With this configuration, the electromagnetic waves received by each of the antennas are outputted to the rectifying section corresponding to the each of the antennas, and are converted to DC power by the rectifying section. The DC power outputted from the rectifying section is supplied to the load via the connection switching section. In this case, the serial/parallel connection state of the output side of the rectifying sections can be switched by the connection switching section. Also, the control section controls, on the basis of the current flowing through the load, the connection switching section so that the output sides of the rectifying sections are connected in the serial/parallel connection state where the RF-DC conversion efficiency is maximized. Thereby, for example, even when the value of the load cannot be freely varied as in a commercial power system, the apparent load with respect to each of the rectifying sections can be varied so as to optimize the RF-DC conversion efficiency. Thereby, even when the state of the electromagnetic waves inputted into the antennas is changed, the load can be adjusted so that the RF-DC conversion efficiency is improved according to the variation of the state of the electromagnetic waves.

A power receiving device may also be configured such that the control section has information in which the measured current is associated with the serial/parallel connection state where maximum RF-DC conversion efficiency is obtained, and such that the control section acquires, from the information, the serial/parallel connection state corresponding to measured current measured by the current measuring section, and controls the connection switching section so that the rectifying sections are in the acquired serial/parallel connection state.

In this way, the control section includes information in which the measured current flowing through the load is associated with the serial/parallel connection state of the rectifying sections, the state enabling maximum RF-DC conversion efficiency to be obtained. Also, the control section controls the serial/parallel connection state of the rectifying sections on the basis of the information. Therefore, the RF-DC conversion efficiency can be easily improved.

The above-described power receiving device may also be configured such that the control section includes first information in which input power of electromagnetic waves received by the plurality of antennas, load resistance, and the measured current are associated with each other, and second information in which the electromagnetic wave input power, the load resistance, and the RF-DC conversion efficiency are associated with each other, such that the control section acquires, from the first information, the electromagnetic wave input power corresponding to the present load resistance and to the measured current, and acquires, from the second information, load resistance which corresponds to the acquired value of the electromagnetic wave input power and which enables maximum RF-DC conversion efficiency to be obtained, and such that the control section switches the connection switching section so that the rectifying sections are in the serial/parallel connection state where load resistance closest to the obtained load resistance can be obtained.

In this way, the control section controls the control switching section by using the first information and the second information, and hence the RF-DC conversion efficiency can be easily improved.

The above-described power receiving device is suitably applied to a wireless power transmission system, which transmits power as electromagnetic waves, and which receives the electromagnetic waves and converts the received electromagnetic waves into power, as in systems such as, for example, a space solar power generation system that transmits power from a solar power generation satellite to a power receiving facility on the ground by electromagnetic waves such as microwaves, and a system that supplies power from a power supply facility on the ground to a structure (for example, a marine vessel, an airplane, and an airship), or the like, to which it is difficult to supply power with wire from the ground power supply facility.

Advantageous Effects of Invention

According to the present invention, it is possible to obtain an effect that, even when the input power is varied, the RF-DC conversion efficiency can be improved.

DESCRIPTION OF EMBODIMENTS

In the following, a power receiving device and a wireless power transmission system, according to an embodiment of the present invention, will be described with reference to the drawings.

A wireless power transmission system according to an embodiment of the present invention includes a power transmission device which transmits power as electromagnetic waves, and a power receiving device which receives the electromagnetic waves transmitted from the power transmission device and which converts the electromagnetic waves into power, as in systems such as, for example, a space solar power generation system which transmits power from a solar power generation satellite to a power receiving facility on the ground by electromagnetic waves, such as microwaves, and a system which supplies, by using electromagnetic waves, power from a power supply facility on the ground to a structure (for example, a marine vessel, an airplane, an airship), or the like, to which it is difficult to supply power with wire from the ground power supply facility.

Figure 1:
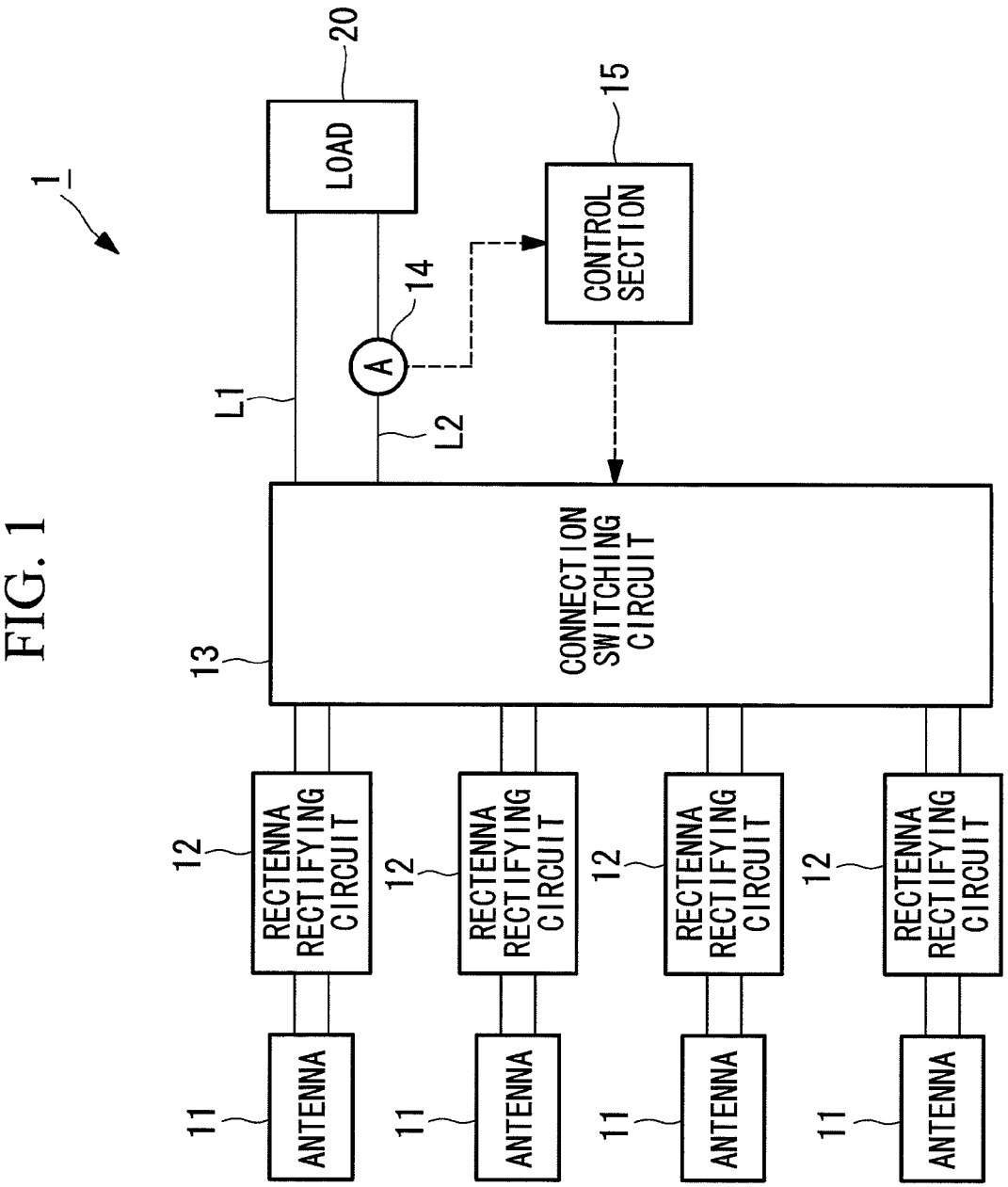
FIG. 1 is a view showing a schematic configuration of a power receiving device according to an embodiment of the present invention.

FIG. 1 shows a schematic configuration of a power receiving device 1 applied to such wireless power transmission system. As shown in FIG. 1, a power receiving device 1 includes a plurality of antennas 11, and a plurality of rectenna rectifying circuits (rectifying sections) 12 which are provided so as to correspond to the antennas 11, respectively.

In FIG. 1, a case is exemplified where four antennas 11 and four rectenna rectifying circuits 12 are provided, but the installed number of antennas and the installed number of rectenna rectifying circuits 12 are not limited. In FIG. 1, a case is exemplified where the rectenna rectifying circuits 12 are provided respectively corresponding to the antennas 11, but for example, one rectenna rectifying circuit 12 may also be provided for an antenna group configured by a plurality of the antennas 11.

The rectenna rectifying circuit 12 includes, for example, a rectifying capacitor, a rectifying diode, and the like, and directly converts the electromagnetic waves received by the corresponding antenna 11 into DC power and outputs the DC power.

Figure 2:
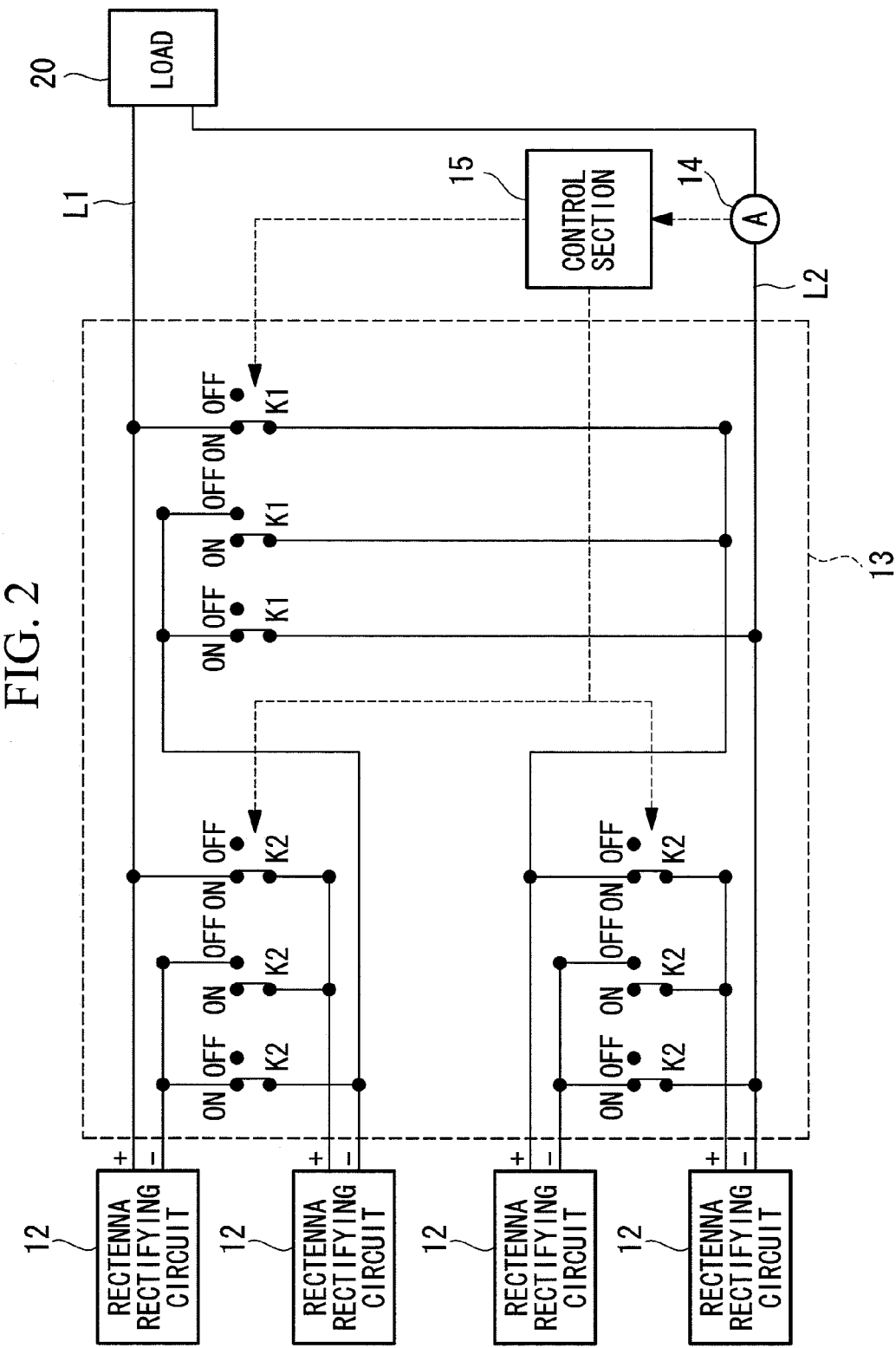
FIG. 2 is a view showing a detailed configuration of a connection switching circuit.

A connection switching circuit (connection switching section) 13, which performs switching between serial/parallel connection states of the output side of the plurality of rectenna rectifying circuits, is provided on the output side of the plurality of rectenna rectifying circuits 12. As shown in FIG. 2, the connection switching circuit 13 includes a plurality of switching elements K1 and K2 which are connected to the output lines of the rectenna rectifying circuits 12. By switching the switching elements K1 and K2, the connection state of the output side of the rectenna rectifying circuits 12 can be switched between three patterns of four parallel connection, two series and two parallel connection, and four series connection. Specifically, when the switching elements K1 and K2 are connected to the ON side, the output side of the rectenna rectifying circuits 12 is connected in the four parallel connection state. When the switching element K1 is connected to the ON side, and when the switching element K2 is connected to the OFF side, the output side of the rectenna rectifying circuits 12 is connected in the two series and two parallel connection state. When the switching elements K1 and K2 are connected to the OFF side, the output side of the rectenna rectifying circuits 12 is connected in the four series connection state. In the present embodiment, the output side of the rectenna rectifying circuits 12 can be switched between the above-described three patterns. However, when the connection switching circuit 13 is more complicatedly configured, the output side of the rectenna rectifying circuits 12 can also be connected in the three series and two parallel connection state.

As shown in FIG. 1 and FIG. 2, the output lines of each of the rectenna rectifying circuits 12 are respectively connected to a common positive output line L1 and a common negative output line L2 via the connection switching circuit 13. The output power from the rectenna rectifying circuits 12 is supplied to a load 20 via these output lines.

A current sensor (current measuring section) 14 for measuring current flowing through the load 20 is provided at the positive output line L1 or the negative electrode output L2. The current measured by the current sensor 14 is outputted to a control section 15. On the basis of the measured current acquired from the current sensor 14, the control section 15 selects a serial/parallel connection state of the rectenna rectifying circuits 12, in which state the RF-DC conversion efficiency is maximized. Then, the control section 15 controls the connection switching circuit 13 so that the rectenna rectifying circuits 12 are in the selected serial/parallel connection state. In this way, the apparent load value with respect to each of the rectenna rectifying circuits 12 can be varied by changing the serial/parallel connection state of each of the rectenna rectifying circuits without directly varying the value of the load 20.

More specifically, the control section 15 includes information in which the measured current is associated with the serial/parallel connection state of the rectenna rectifying circuits, the state enabling optimum RF-DC conversion efficiency to be obtained. From the information, the control section 15 acquires the serial/parallel connection state of the rectenna rectifying circuits 12, the state corresponding to the measured current measured by the current sensor 14, and controls the connection switching circuit 13 so that the rectenna rectifying circuits 12 are in the acquired serial/parallel connection state.

More specifically, the control section 15 includes first information in which the input power of electromagnetic waves received by the plurality of receiving antennas 11, the load resistance, and the measured current are associated with each other, and second information in which the electromagnetic wave input power, the load resistance, and the RF-DC conversion efficiency are associated with each other.

Figure 3:
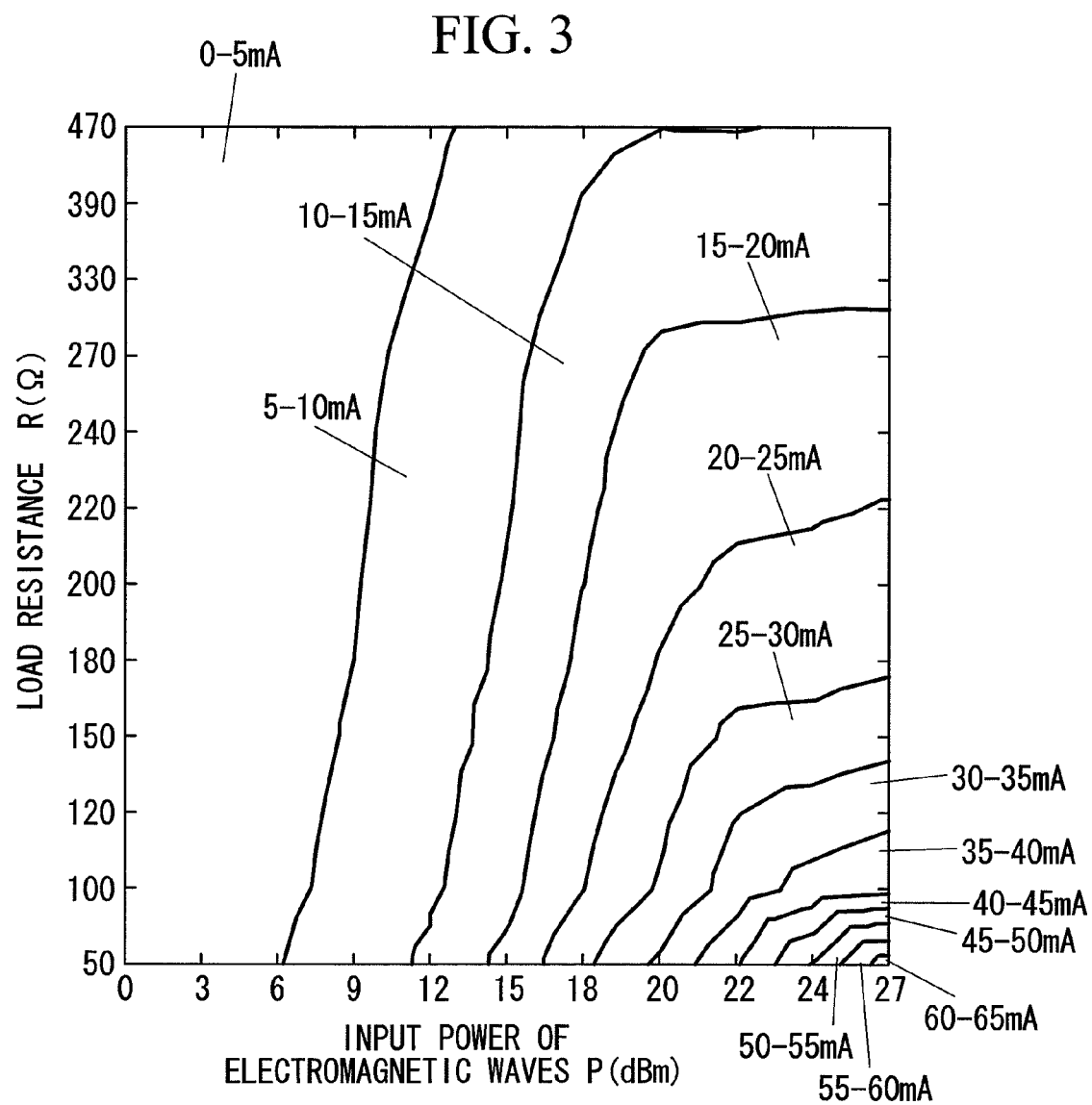
FIG. 3 is a view showing an example of first information.

FIG. 3 shows an example of the first information. In FIG. 3, the distribution of the output current (measured current) I [mA] is shown in the coordinate system where the horizontal axis represents the input power P [dBm] of electromagnetic waves, and where the vertical axis represents the resistance R [Ω] of the load resistor. In FIG. 3, the output current I is shown in the unit of 5 mA, but the unit is not limited in particular. Output current without data may be obtained by performing interpolation between the existing data. Further, the control section 15 may include a relational operation expression instead of the map as shown in FIG. 3.

Figure 4:
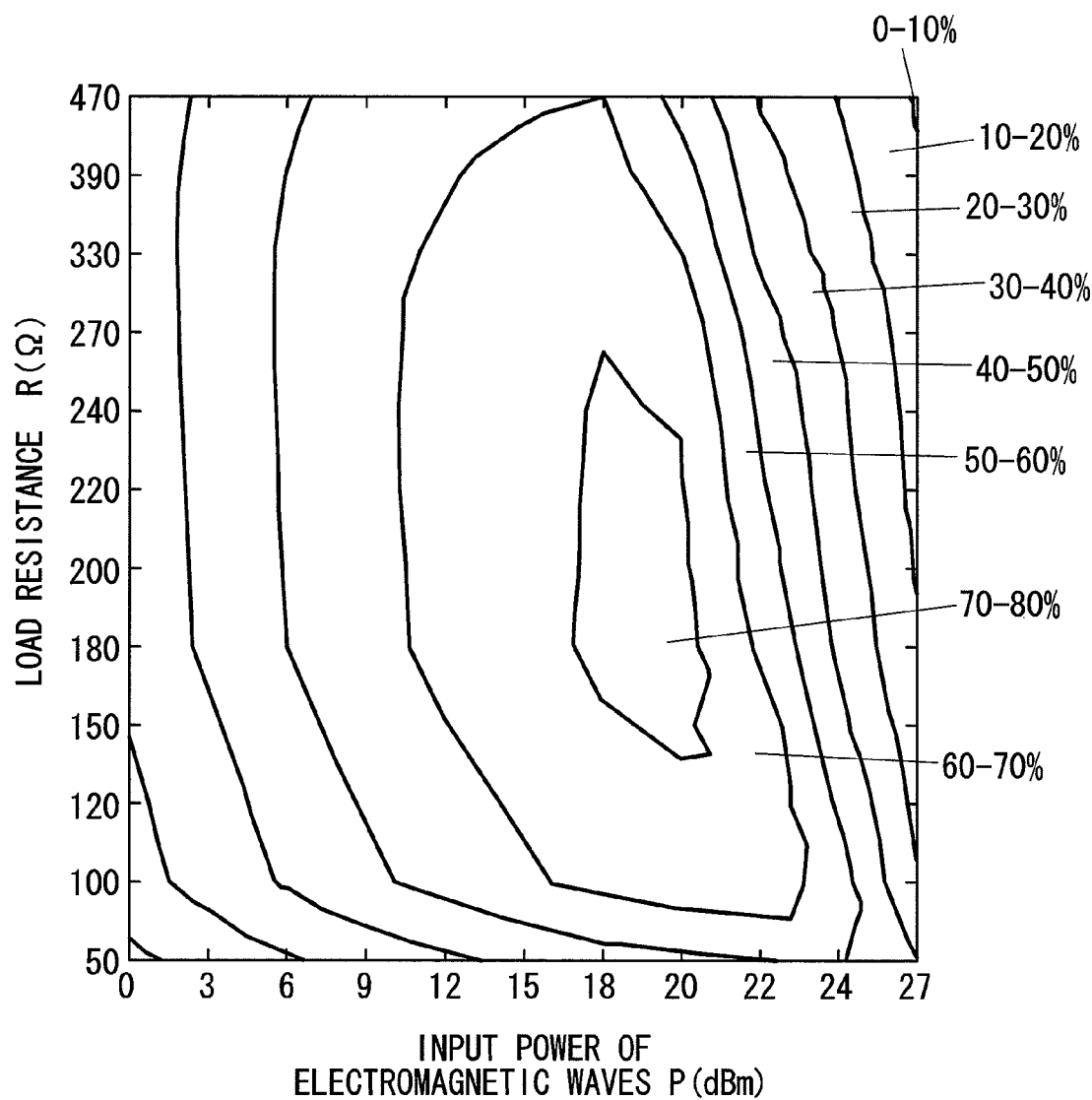
FIG. 4 is a view showing an example of second information.
Figure 5:
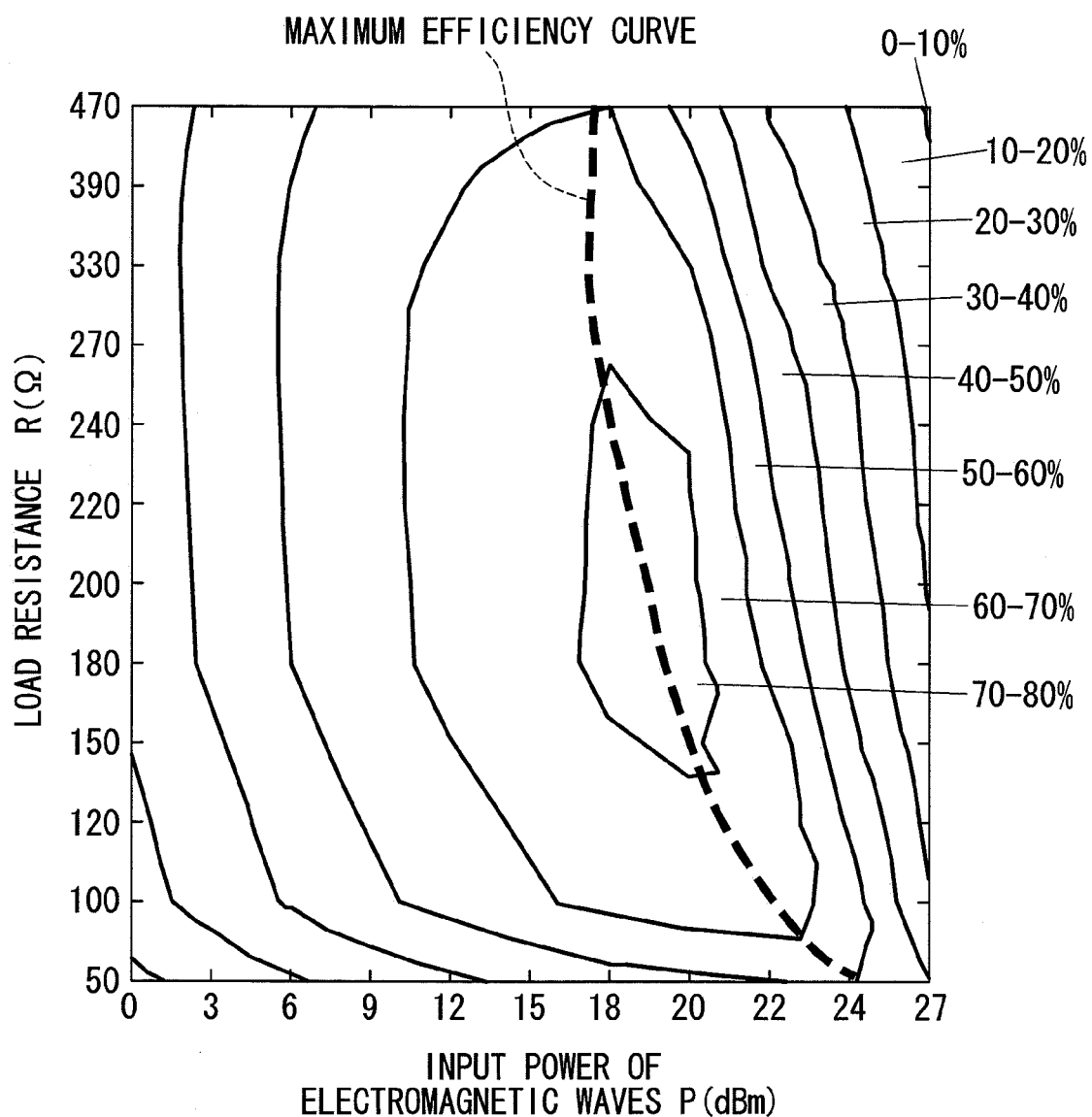
FIG. 5 is a view showing another example of the second information.

FIG. 4 shows an example of the second information. In FIG. 4, the distribution of RF-DC conversion efficiency η [%] is shown in the coordinate system where the horizontal axis represents the input power P [dBm] of electromagnetic waves, and where the vertical axis represents the load resistance R [Ω]. In FIG. 4, the RF-DC conversion efficiency η [%] is shown in the unit of 10%, but the unit is not limited in particular. RF-DC conversion efficiency η without data may be obtained by performing interpolation between the existing data. Further, the control section 15 may include a relational operation expression instead of the map as shown in FIG. 4. As shown in FIG. 5, the control section 15 may obtain, from the map shown in FIG. 4, a maximum efficiency curve representing maximum RF-DC conversion efficiency, and may include, as the second information, the characteristic expression of the obtained maximum efficiency curve.

When the control section 15 receives the measured current from the current sensor 14, the control section 15 acquires, from the first information shown in FIG. 3, the electromagnetic wave input power corresponding to the measured current and to the present load resistance, and also acquires, from the second information shown in FIG. 4, the load resistance at which maximum RF-DC conversion efficiency corresponding to the acquired electromagnetic wave input power is obtained. Then, the control section 15 switches the switching elements K1 and K2 provided in the connection switching circuit 13 so that the rectenna rectifying circuits 12 are connected in a serial/parallel connection state where load resistance closest to the acquired load resistance is obtained.

Next, an operation of the power receiving device according to the present embodiment configured as described above will be described. Here, for convenience of explanation, the switches K1 and K2 of the connection switching circuit 13 are set in the ON state. Therefore, the operation of the power receiving device is described by assuming the case where the output sides of the rectenna rectifying circuits 12 are connected in the four parallel connection state.

In the power receiving device 1, the electromagnetic waves received by each of the antennas 11 are converted into DC power by the rectenna rectifying circuit 12 corresponding to the each of the antennas 11. The DC power is supplied to the load 20 via the output lines of the rectenna rectifying circuits 12 and via the common positive output line L1 and the common negative output line L2. Further, the present current is measured by the current sensor 14, and the measured current is outputted to the control section 15.

On the basis of the received measured current, the control section 15 acquires electromagnetic wave input power corresponding to the measured current by referring to the first information shown in FIG. 3. Specifically, the control section 15 calculates load resistance with respect to each of the rectenna rectifying circuits 12 from the present connection state (four parallel connection state) of the connection switching circuit 13, and from the present value of the load 20. At this time, as the value of the load 20, a design value set beforehand may be used, or a value obtained by measuring the actual value of the load 20 may also be used.

Figure 6:
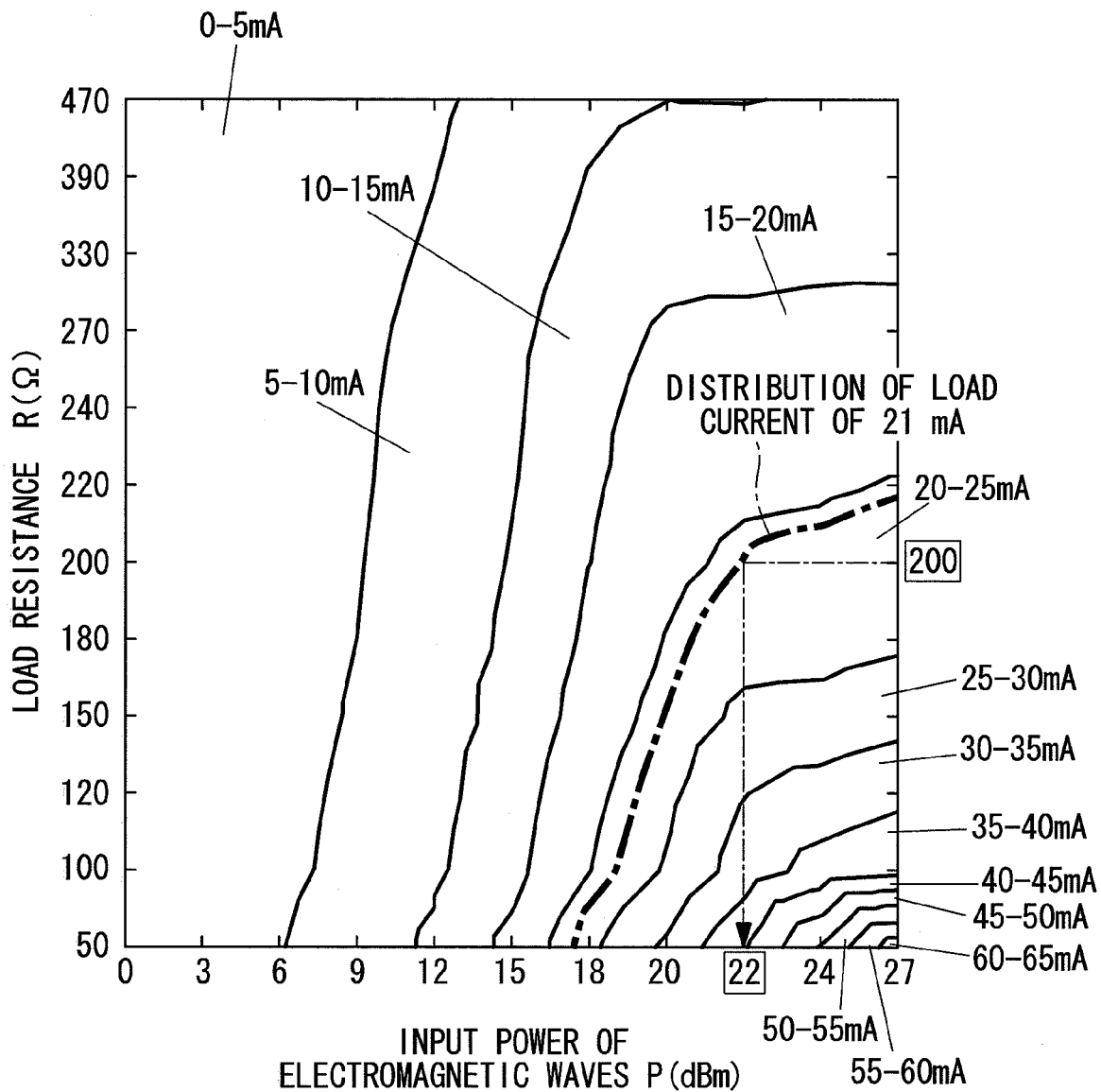
FIG. 6 is a view for explaining a procedure for specifying electromagnetic wave input power by using the first information.

Subsequently, the control section 15 acquires, from the first information, electromagnetic wave input power which corresponds to the calculated load resistance and to the measured current inputted from the current sensor 14. For example, as shown in FIG. 6, when the calculated load resistance is 200 [Ω] and when the measured current is 21 mA, a value of 22 [dBm] is obtained as the electromagnetic wave input power.

Figure 7:
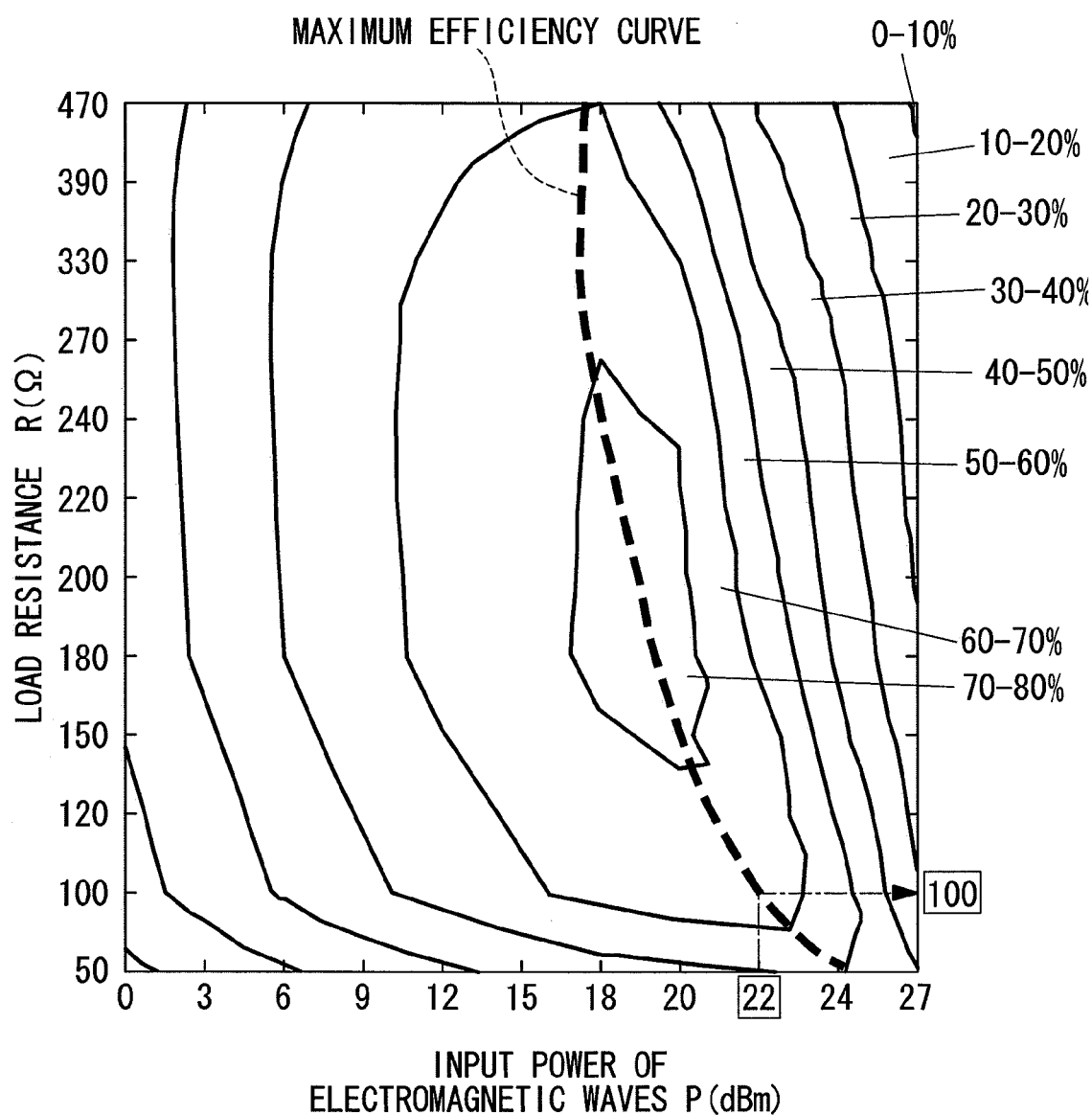
FIG. 7 is a view for explaining a procedure for specifying, by using the second information, load resistance at which optimum RF-DC conversion efficiency is obtained.

Subsequently, the control section 15 acquires, from the maximum efficiency curve shown in FIG. 5, load resistance R [Ω] which corresponds to the electromagnetic wave input power acquired from FIG. 3 and which maximizes the RF-DC conversion efficiency. As a result, as shown in FIG. 7, a value of 100 [Ω] is obtained as the load resistance at which the RF-DC conversion efficiency is maximized at the time when the electromagnetic wave input power is 22 [dBm]. In consideration of the present value of the load 20, the control section 15 selects a connection state where the load resistance with respect to each of the rectenna rectifying circuits 12 becomes closest to 100 [Ω], from the connection states of four parallel connection, two series and two parallel connection, and four series connection. Then, the control section 15 controls the switching elements K1 and K2 of the connection switching circuit 13 so that the rectenna rectifying circuits 12 are in the selected connection state. Thereby, load resistance most suitable for the present power receiving state can be selected, and the RF-DC conversion efficiency can be improved as much as possible.

As described above, in the power receiving device and the wireless power transmission system, according to the present embodiment, the connection state of the output side of the rectenna rectifying circuits 12 is varied according to the electromagnetic wave input power, and hence the apparent load resistance value with respect to each of the rectenna rectifying circuits 12 can be varied according to the electromagnetic wave input power. Thereby, for example, even when the load 20 cannot be freely changed as in a commercial power system, the RF-DC conversion efficiency as high as possible can be obtained in such a manner that the connection state of the output side of the rectenna rectifying circuits 12 is varied so as to obtain load resistance at which the RF-DC conversion efficiency can be maximized with respect to the electromagnetic wave input power.

{Modification 1}

Figures 8, 9:
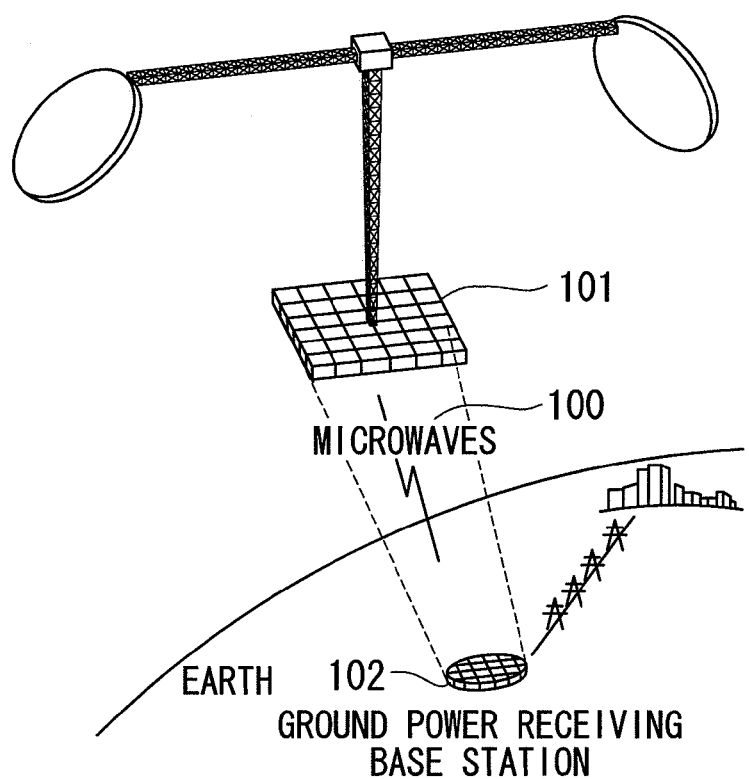
FIG. 8 is a view showing an example of a correspondence table in which the measured current is directly associated with the connection state of the rectenna rectifying circuits, the state enabling RF-CD conversion efficiency to be maximized.
FIG. 9 is a view for explaining a space solar power generation system.

In the above-described embodiment, for example, the control section 15 includes the first information and the second information which are respectively formed as maps. On the basis of these kinds of information, the control section 15 obtains an optimum load resistance value corresponding to the electromagnetic wave input power, and controls the connection switching circuit 13 on the basis of the obtained load resistance value. Instead of such configuration, for example, a correspondence table, in which the measured current is made to directly correspond to the connection state of the rectenna rectifying circuits 12, the state enabling the RF-CD conversion efficiency to be maximized, may be prepared beforehand on the basis of the first information and the second information, so that an output side connection state of the rectenna rectifying circuits is directly selected from the measured current on the basis of the correspondence table. FIG. 8 shows an example of the correspondence table in which the measured current is made to directly correspond to the connection state of the rectenna rectifying circuits 12, the state enabling the RF-CD conversion efficiency to be maximized. In such correspondence table, for example, when the measured current I is a preset first threshold value $I_1$ or less, the switching elements K1 and K2 in the connection switching circuit 13 are set in the ON state (four parallel connection state), while when the measured current I is larger than the preset first threshold value $I_1$ and is a preset second threshold value $I_2$ or less, the switching element K1 and the switching element K2 in the connection switching circuit 13 are respectively set in the OFF state and the ON state (two series and two parallel connection state). Further, when the measured current I is larger than the preset second threshold value $I_2$, the switching element K1 and the switching element K2 in the connection switching circuit 13 are set in the OFF state (four serial connection state).

In this way, when the connection switching circuit 13 is controlled by using the correspondence table in which the measured current is made to directly correspond to the connection state of the rectenna rectifying circuits 12, the state enabling the RF-CD conversion efficiency to be maximized, it is possible to reduce the amount of processing and the processing time as compared with the case of using the above-described maps, or the like.

REFERENCE SIGNS LIST

1 Power receiving device
11 Antenna
12 Rectenna rectifying circuit
13 Connection switching circuit
14 Current sensor
15 Control section
20 Load

The invention claimed is:

1. A power receiving device comprising:
   a plurality of antennas;
   a plurality of rectifying sections each of which is provided to correspond to one of or a plurality of the antennas and converts electromagnetic waves received by the corresponding antenna into DC power and outputs the DC power;
   a connection switching section which is provided between the plurality of rectifying sections and a load and performs switching between serial/parallel connection states of the output side of the plurality of rectifying sections;
   a current measuring section which measures current flowing through the load; and
   a control section which, on the basis of measured current measured by the current measuring section, selects a serial/parallel connection state of the rectifying sections, the state enabling RF-DC conversion efficiency to be maximized, and controls the connection switching section so that the rectifying sections are connected in the selected serial/parallel connection state,
   wherein the control section includes
   first information in which input power of electromagnetic waves received by the plurality of antennas, load resistance, and the measured current are associated with each other, and
   second information in which the electromagnetic wave input power, the load resistance, and the RF-DC conversion efficiency are associated with each other,
   wherein, the control section acquires, from the first information, electromagnetic wave input power corresponding to present load resistance and to the measured current, and acquires, from the second information, load resistance at which a maximum RF-DC efficiency corresponding to the acquired electromagnetic wave input power is obtained, the control section switches the connection switching section so that the rectifying sections are in a serial/parallel connection state where load resistance closest to the obtained load resistance can be obtained.

\* \* \* \* \*